United States Patent [19]

Widiger

[11] 4,420,627
[45] Dec. 13, 1983

[54] HYDRAZINE DYES

[75] Inventor: Gary N. Widiger, Lexington, Mass.

[73] Assignee: Polaroid Corporation, Cambridge, Mass.

[21] Appl. No.: 332,020

[22] Filed: Dec. 18, 1981

[51] Int. Cl.³ .............................................. G03C 1/40
[52] U.S. Cl. .................................. 549/394; 260/163; 260/207; 260/245.76; 260/245.81; 260/377; 542/441; 564/150
[58] Field of Search ........................................ 549/394

[56] References Cited

U.S. PATENT DOCUMENTS

| | | | |
|---|---|---|---|
| 3,245,789 | 4/1966 | Rogers | 96/29 |
| 3,628,952 | 12/1971 | Puschel et al. | 96/3 |
| 3,844,785 | 10/1974 | Puschel et al. | 96/29 D |
| 3,883,529 | 5/1975 | Austin | 260/249.5 |
| 3,956,300 | 5/1976 | Austin et al. | 260/249.5 |
| 4,237,281 | 12/1980 | Long | 544/99 |
| 4,264,507 | 4/1981 | Borror et al. | 260/336 |
| 4,264,701 | 4/1981 | Locatell et al. | 430/17 |

FOREIGN PATENT DOCUMENTS

| | | |
|---|---|---|
| 895041 | 9/1953 | Fed. Rep. of Germany . |
| 2460491 | 7/1976 | Fed. Rep. of Germany . |
| 55-123076 | 11/1980 | Japan . |
| 1423346 | 2/1976 | United Kingdom . |
| 2016031A | 9/1979 | United Kingdom . |

OTHER PUBLICATIONS

Kitzing et al., Chemical Abstracts, vol. 91 (1979) 176,663m.

Primary Examiner—Richard Raymond
Attorney, Agent, or Firm—Gaetano D. Maccarone

[57] ABSTRACT

There are described novel compounds which are represented by the formula

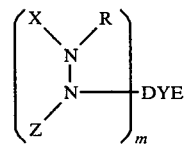

wherein X is

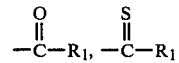

or $-SO_2R_1$; Z is H, alkyl or aryl; R is H, alkyl or aryl; DYE is any dye moiety; $R_1$ is H, alkyl, aryl, $-NH_2$, $-NHR_2$, $-N(R_2)_2$ or $-OR_2$; $R_2$ is H, alkyl or aryl; and m is 1 or 2. The compounds are useful as dyes.

2 Claims, No Drawings

HYDRAZINE DYES

CROSS REFERENCE TO RELATED APPLICATIONS

Reference is made to copending commonly assigned patent application Ser. No. 331,995 filed on even date herewith, now U.S. Pat. No. 4,386,150.

BACKGROUND OF THE INVENTION

This invention is related to novel compounds and, more particularly, to compounds which are useful as dyes.

It is therefore the object of the invention to provide novel compounds.

It is another object to provide compounds which are useful as dyes.

It is a further object to provide compounds which include a hydrazine moiety.

BRIEF SUMMARY OF THE INVENTION

These and other objects and advantages are accomplished in accordance with the invention by providing novel compounds which are represented by the formula

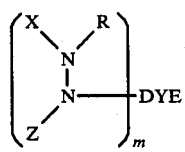

wherein X is

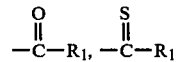

or $-SO_2-R_1$; Z is H; alkyl, preferably having 2 or 3 carbon atoms, or aryl such as phenyl or naphthyl; R is H, alkyl, preferably having 2 or 3 carbon atoms, or aryl such as phenyl or naphthyl, DYE is any dye moiety having an absorption peak within the ultraviolet, visible and infrared regions of the electromagnetic spectrum and which exhibits substantial absorption in the visible region, thus enabling it to be seen by the human eye; $R_1$ is H, alkyl, preferably having 2 or 3 carbon atoms, aryl such as phenyl or naphthyl, $-NH_2$, $-NHR_2$,

or $-OR_2$; $R_2$ is H, alkyl, preferably having 2 or 3 carbon atoms, or aryl such as phenyl or naphthyl; and m is 1 or 2. Where Z, R, $R_1$, and $R_2$ are alkyl, the chain length can vary considerably, for example, up to about 15 carbon atoms or more, dependent upon the characteristics desired. For example, where it is desired to have a ballast group in the compound, one or more of these groups can be a relatively long alkyl chain having about 15 carbon atoms or more.

The dye moiety may be of any type such as, for example, azo, azomethine, xanthene, anthraquinone, cyanine, phthalocyanine, nitrophenyl, quinone-methide, etc. The dye compounds of the invention may have symmetrical or unsymmetrical structures.

DESCRIPTION OF THE PREFERRED EMBODIMENTS

Specific dyes which are within the scope of the invention are represented by the following formulas:

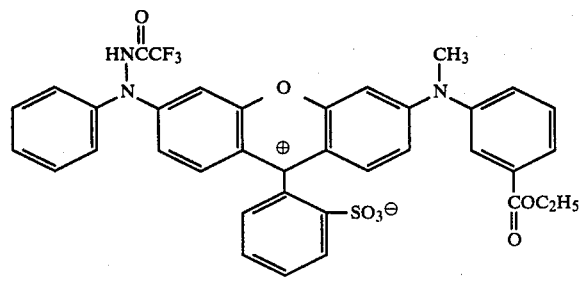

DYE I

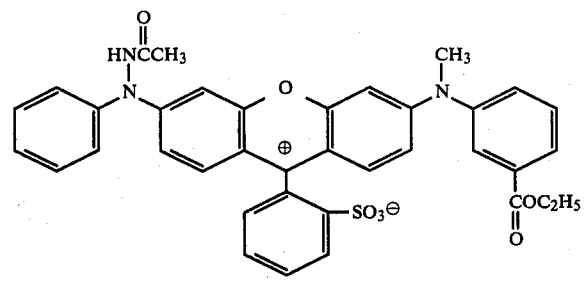

DYE II

-continued
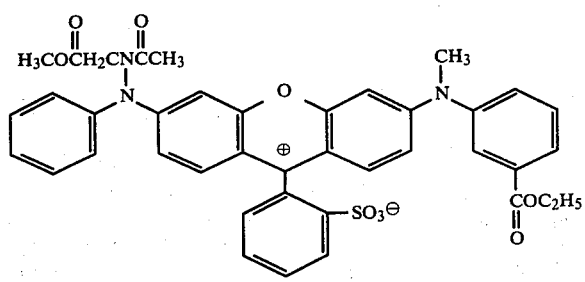
DYE III
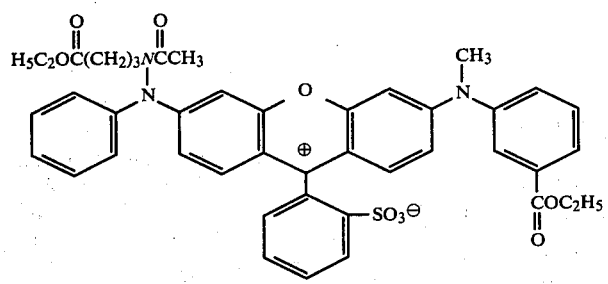
DYE IV
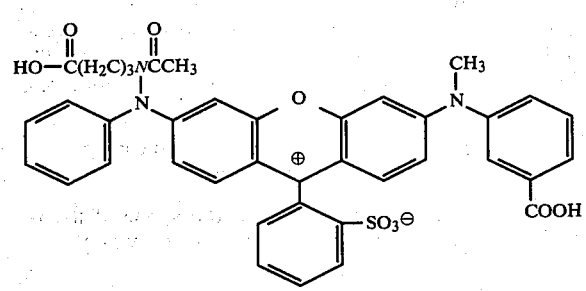
DYE V
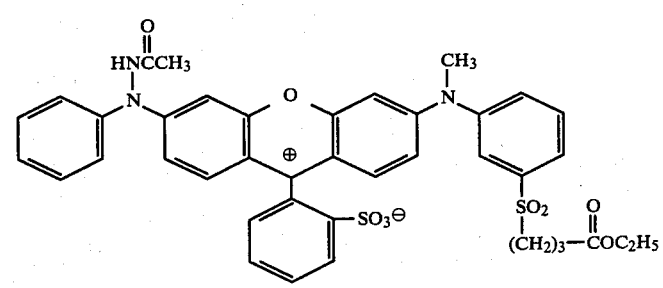
DYE VI
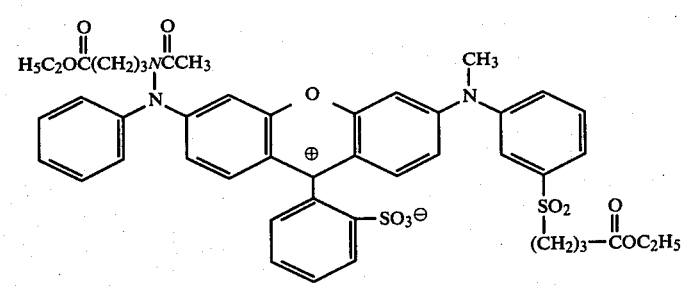
DYE VII

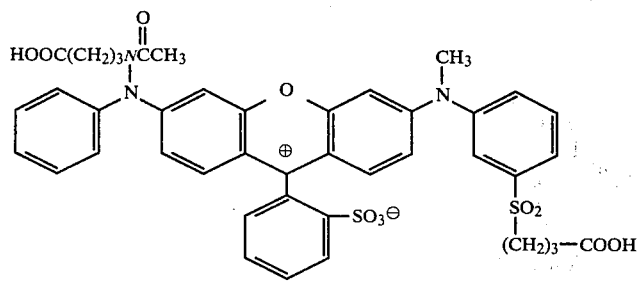
DYE VIII
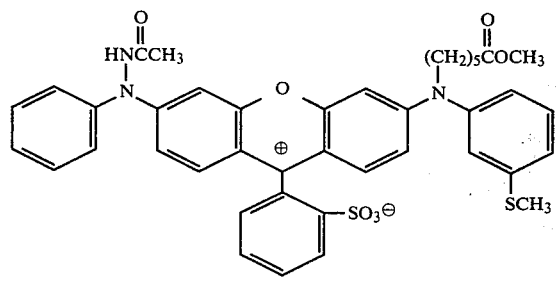
DYE IX
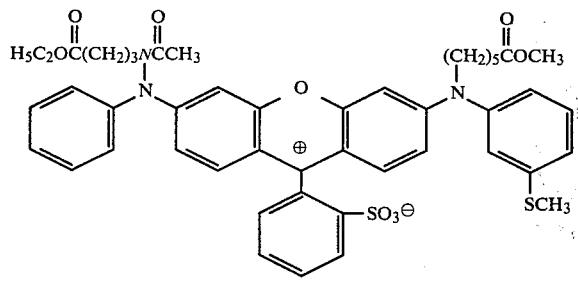
DYE X
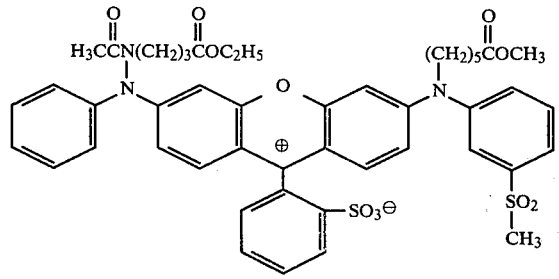
DYE XI
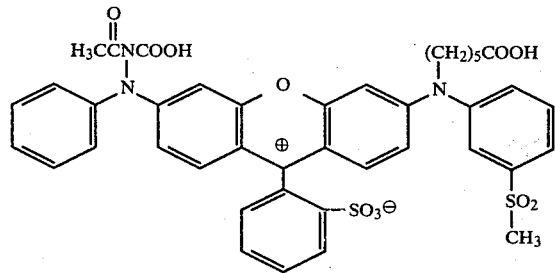
DYE XII DYE XIII
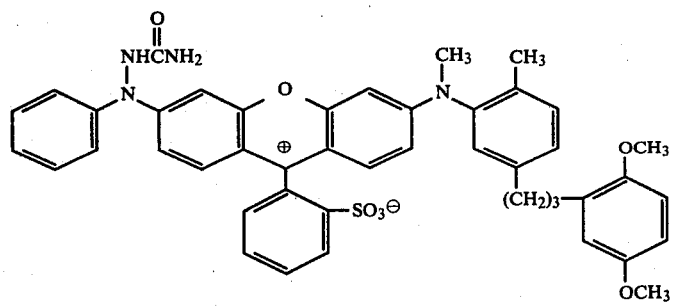
DYE XIV
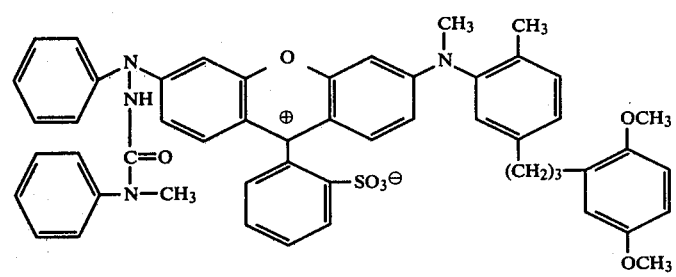
DYE XV
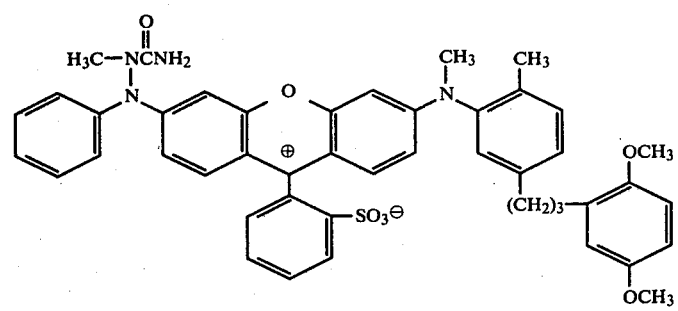
DYE XVI
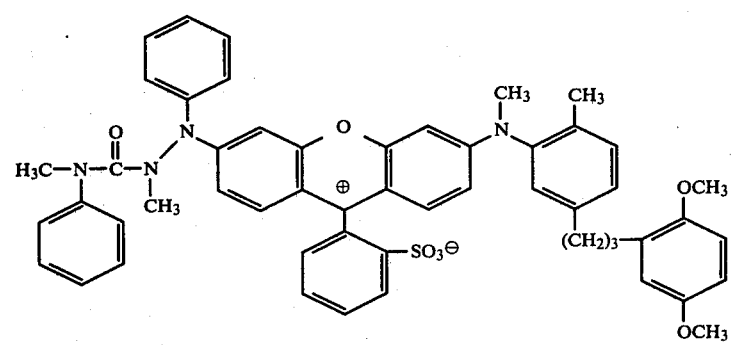
DYE XVII
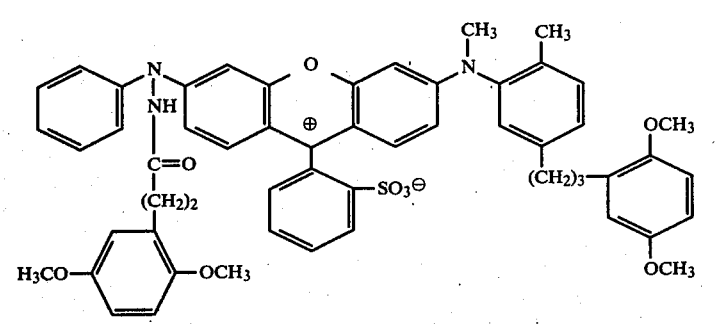

-continued
DYE XVIII
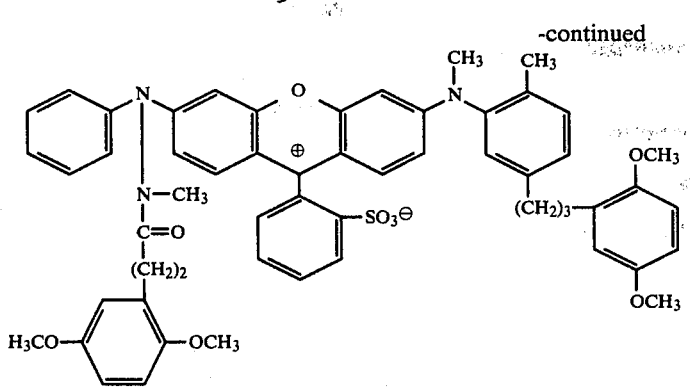
DYE XIX
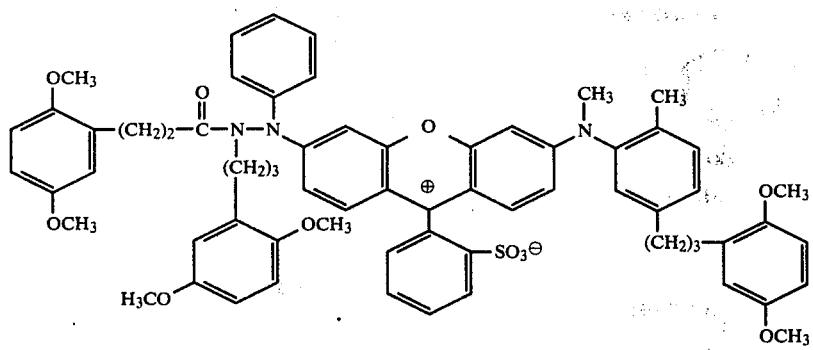
DYE XX
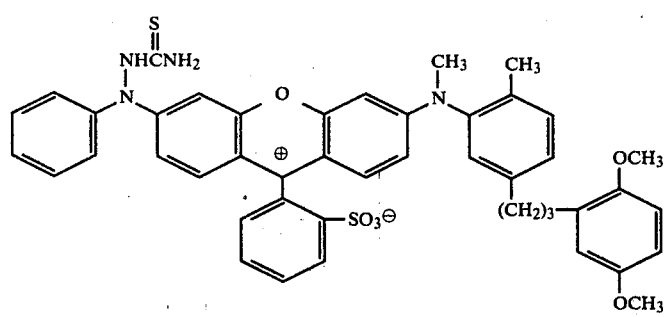
DYE XXI
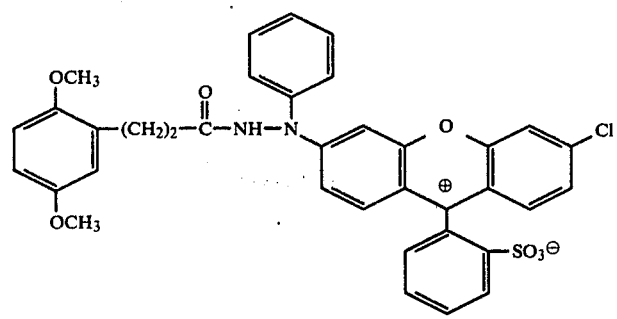
DYE XXII
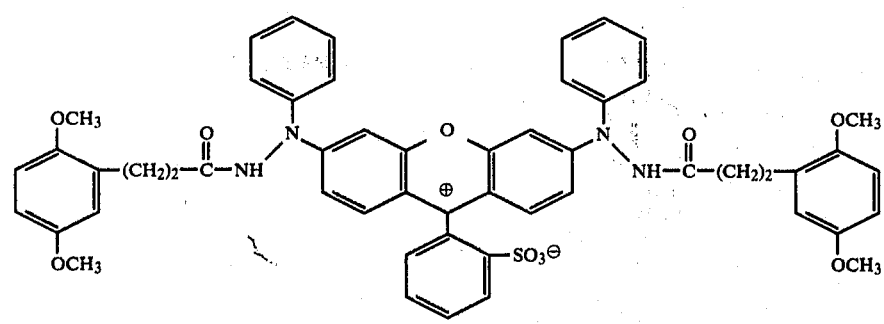

-continued
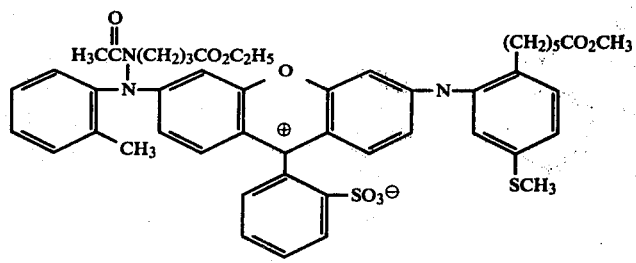
DYE XXIII
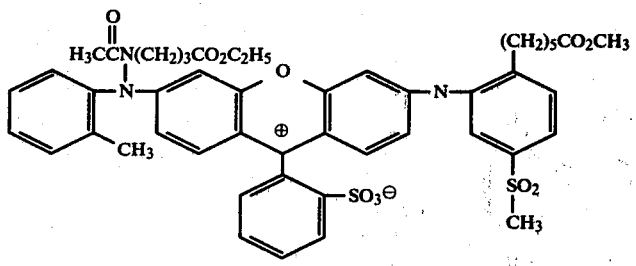
DYE XXIV
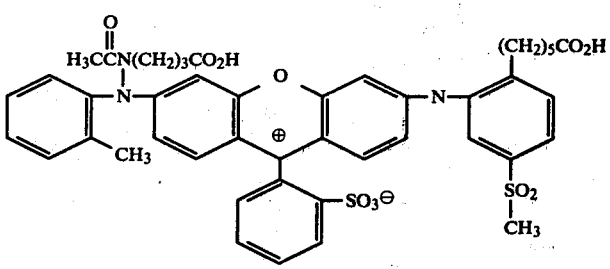
DYE XXV
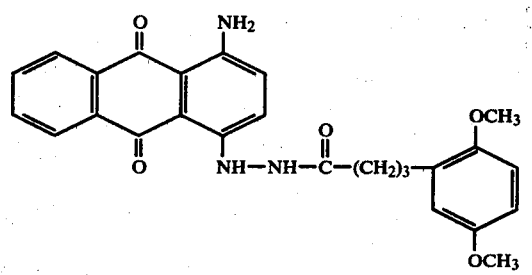
DYE XXVI
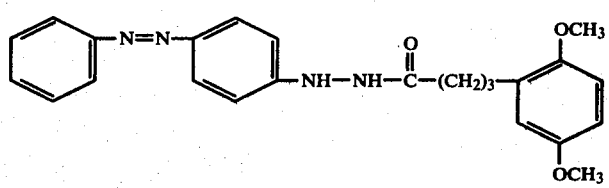
DYE XXVII
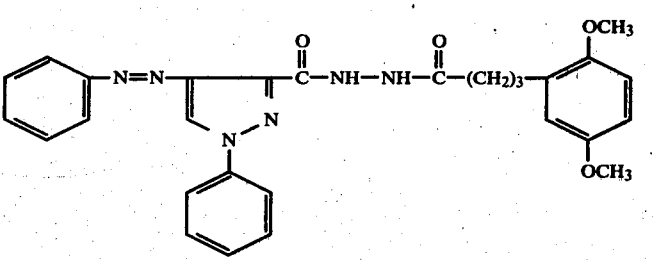
DYE XXVIII

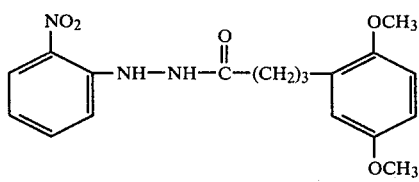

DYE XXIX

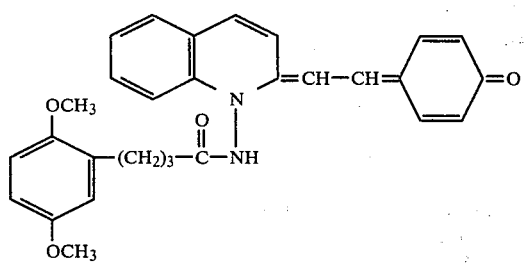

DYE XXX

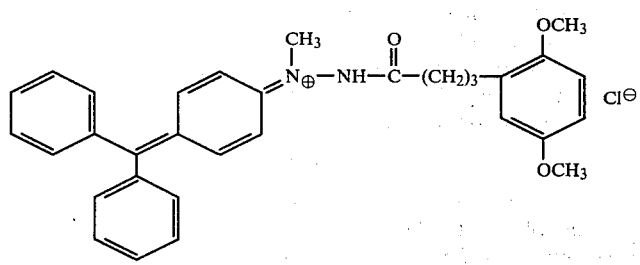

DYE XXXI

The dyes of the invention can be prepared according to techniques which are known in the art and these will be apparent from the detailed description of specific compounds provided in the examples. In general, the dye compounds can be prepared by reacting the dye moiety with a small excess of an appropriate hydrazide compound in the presence of a solvent and a base. For example, the sulfoxanthene compounds can be prepared by heating a substituted chlorosulfoxanthene with an excess of a hydrazide in the presence of a solvent and a base.

The dye compounds of the invention are typically soluble in various solvents such as, for example, water and various organic solvents such as methylene chloride, methanol, etc. The dyes may be applied to any object such as fabric and the like by dissolving the dye in a suitable solvent and applying the solution to the object by any of many well known techniques.

The invention will now be described in detail with respect to specific preferred embodiments by way of Examples, it being understood that these are intended to be illustrative only and the invention is not limited to the materials, process parameters, conditions, etc. which are recited therein.

EXAMPLE I

A mixture of 466 mg (0.85 mmole) of a compound represented by the formula

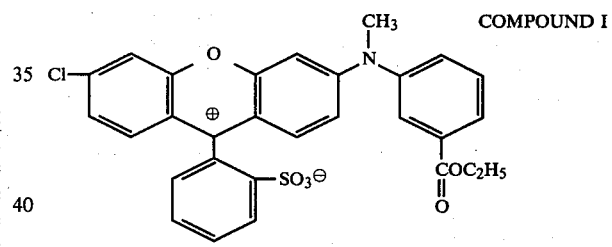

COMPOUND I 174 mg (0.85 mmole) of a compound represented by the formula

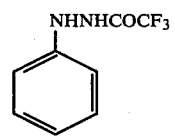

and 34 mg (0.85 mmole) of magnesium oxide in 4 ml of dimethylsulfoxide was stirred under nitrogen in a 160° C. oil bath for about 40 minutes. The cooled solution was poured into an ice-1 N hydrochloric acid mixture and the resulting solid was collected by filtration, washed with water, and dissolved in 5/95V/V methanol-chloroform. The solvent was dried, removed and the residue was dried under high vacuum to give Dye I. The solid was purified by preparative thin layer chromatography on silica gel eluting with 10/90 and 5/95 V/V methanol-chloroform to give pure Dye I, $\lambda max$(meth.cell.)=584 nm.

EXAMPLE II

A mixture of 7.06 g (12.9 mmole) of compound I, 1.94 g (12.9 mmole) of a compound represented by the formula

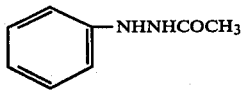

and 0.516 g (12.9 mmole) of magnesium oxide in 40 ml of dimethylsulfoxide was heated with stirring in a 150° C. oil bath for 40 minutes. The cooled solution was poured into an ice-1 N hydrochloric acid mixture and the resulting solid collected by filtration and dissolved in chloroform. The solvent was removed and the solid dried under vacuum to give crude Dye II. The crude product was purified by column chromatography on an $Al_2O_3$ column eluting with $CHCl_3$ to give 3.0 g of pure Dye II.

EXAMPLE III

To 24 mg (1 mmole) of NaH in a round bottom flask under nitrogen there was added with stirring a solution of 661 mg of Dye II in 4 ml of dimethylformamide. After 10 minutes a solution of 153 mg of bromomethylacetate in 1 ml of dimethylformamide was added and stirring continued for 2 hours. An additional 20 mg of NaH were added and after 20 minutes 40 mg of NaH and 250μ liters of the bromomethylacetate were added. After stirring for one hour the reaction mixture was poured into a mixture of 50 ml of chloroform and 50 ml of 1 N hydrochloric acid. The organic phase was isolated, dried with $Na_2SO_4$ and concentrated under vacuum. The crude dye was purified by column chromatography on nuetral $Al_2O_3$ eluting with 99/1 V/V chloroform-methanol to give 230 mg of pure Dye III, λmax (meth.cell.)=544 nm.

EXAMPLE IV

A mixture of 200 mg (0.303 mmole) of Dye II, 417 mg (3.03 mmole) of anhydrous finely powdered $K_2CO_3$ and 590 mg (3.03 mmole) of ethylbromobutyrate in 2 ml of dry dimethylformamide was heated with stirring under nitrogen in a 90° C. oil bath for 1 hour. The cooled solution was diluted with chloroform and washed with 1 N hydrochloric acid. The organic phase was separated, dried over $Na_2SO_4$, the solvent removed by rotary evaporation and the resiude dried under high vacuum. The crude product was purified by column chromatography on neutral $Al_2O_3$ to give 166 mg of Dye IV.

EXAMPLE V

To a stirred solution of 587 mg (0.748 mmole) of Dye IV in 6 ml of dioxane there were added 3 ml of 1 N NaOH. The mixture turned very dark. Stirring was continued for 1⅜ hours and the reaction mixture was then poured into a mixture of ice-1 N hydrochloric acid. The resulting solid was collected by filtration and washed with water. Tetrahydrofuran was added and removed and the residue was dried under high vacuum to give 390 mg of Dye V.

EXAMPLE VI

A mixture of 393 mg (2.62 mmole) of acetylphenylhydrazine, 1.71 g (2.62 mmole) of a compound represented by the formula

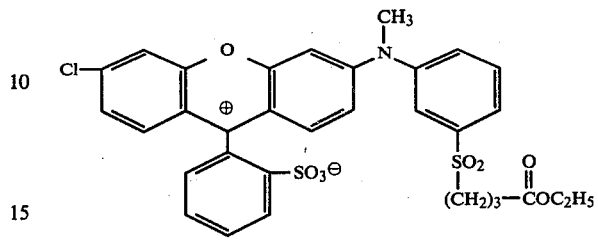

and 105 mg (2.62 mmole) of magnesium oxide in 7 ml of dimethylsulfoxide was heated under nitrogen with stirring in a 155° C. oil bath for 45 minutes. The cooled reaction mixture was poured onto an ice-1 N hydrochloric acid mixture and the resulting solid was collected by filtration, washed with water and dried overnight in air. The solid was purified by column chromatography on netural $Al_2O_3$ to give Dye VI.

EXAMPLE VII

A mixture of 1.15 g (1.5 mmole) of Dye VI, 2.5 g (15 mmole) of ethylbromobutyrate and 2.07 g (15 mmole) of anhydrous finely powdered $K_2CO_3$ in 10 ml of dimethylformamide was heated with stirring under nitrogen in a 100° C. oil bath for 1 hour. The cooled reaction mixture was diluted with chloroform and washed with aqueous 1 N hydrochloric acid. The chloroform layer was dried over $Na_2SO_4$, and the solvent removed by rotary evaporation and then under high vacuum. The residue was triturated with petroleum ether and purified by column chromatography with $Al_2O_3$ to give 1.04 g of pure Dye VII.

EXAMPLE VIII

To a stirred solution of 1.04 g (1.18 mmole) of Dye VII in 9 ml of dioxane there were added 4.75 ml of 1 N NaOH. The color became very dark. After stirring for 1⅜ hours the reaction mixture was poured onto an ice-1 N hydrochloric acid mixture and the resulting solid collected by filtration, washed with water and was taken up in tetrahydrofuran. The solvent was removed and the residue was dried under vacuum to give 900 mg of Dye VIII.

EXAMPLE IX

A mixture of 2.2 g (3.46 mmole) of a compound represented by formula

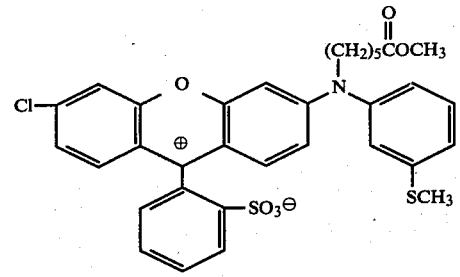

520 mg of N-acetyl-N'-phenylhydrazine and 139 mg of magnesium oxide in 9 ml of dimethylsulfoxide was heated under nitrogen with stirring in a 150° C. oil bath for 85 minutes. The cooled reaction mixture was poured onto an ice-1 N hydrochloric acid mixture and the resulting solid was collected by filtration, washed with water, pressed dry and dissolved in chloroform. The solvent was removed and the residue was dried under high vacuum to give 2.6 of Dye IX.

EXAMPLE X

A solution of 2.6 g (3.5 mmole) of Dye IX, 5.84 g (30 mmole) of ethyl bromobutyrate and 4.83 g (35 mmole) of finely ground $K_2CO_3$ in 25 ml of dimethylformamide was heated under nitrogen with stirring in a 100° C. oil bath for 75 minutes. The cooled solution was diluted with chloroform, washed with 1N hydrochloric acid and saline solution and was dried over $Na_2SO_4$. The solvent was removed. The residue was triturated with petroleum ether and was purified by column chromatography on netural $Al_2O_3$ eluting with chloroform to give 1.85 g of Dye XI.

EXAMPLE XI

To a solution of 1.85 g (2.144 mmole) of Dye X in glacial acetic acid there was added a solution of 1.3 g of 40% (w/w) of peracetic acid in acetic acid. A slight exotherm occurred initially. After 70 minutes the reaction mixture was poured into water and saturated $NaHCO_3$ was added slowly until the acid was neutralized. The mixture was extracted with chloroform. The chloroform was separated, washed with saline solution, dried and the solvent was removed to give 2.14 g of Dye XI.

EXAMPLE XII

A mixture of 2.14 g (2.4 mmole) of Dye XI and 9.6 ml (9.6 mmole) of 1 N NaOH in 20 ml of dioxane was stirred for 1½ hours and then poured into a mixture of ice and 1 N hydrochloric acid. The resulting solid was collected by filtration, washed with water and was dissolved in tetrahydrofuran. The tetrahydrofuran was removed to leave 1.5 g of Dye XII.

EXAMPLE XIII

A mixture of 4.05 g (10 mmole) of a compound represented by the formula

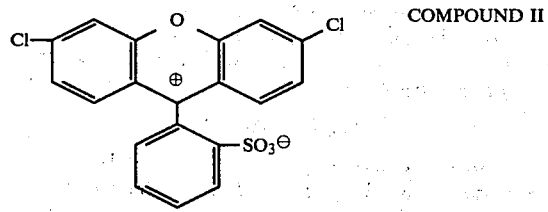

COMPOUND II and 5.70 g (20 mmole) of a compound represented by the formula

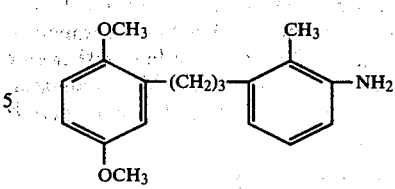

COMPOUND III in 50 ml of diglyme was heated on a steam bath for about 3½ hours. The cooled reaction mixture was poured into about 300 ml of water, (sodium chloride solution was added to induce flocculation) the precipitate collected by filtration and washed with water and ether and dried to give 6.08 g of a compound represented by the formula

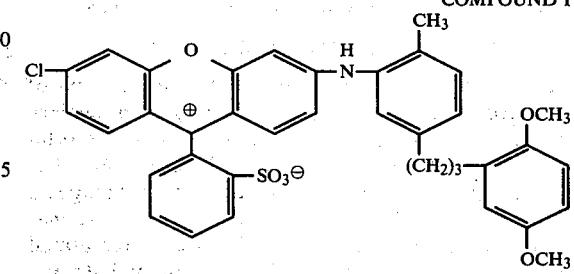

COMPOUND IV

A mixture of 6.53 g (10 mmole) of compound IV in 50 ml of diglyme was treated with 1.78 g (15 mmole) of potassium tertiary butoxide. Compound IV gradually dissolved and the solution became dark. The solution was cooled to 0° C. and 1.42 ml (15 mmole) of dimethyl sulfate were added. The reaction mixture was stirred at 0° C. for 1 hour and at room temperature over the weekend. The reaction mixture was poured into about 700 ml of water (including some salt to encourage floculation), the precipitate collected by filtration, dissolved in methylene chloride and dried over sodium sulfate. The methylene chloride was removed and the residue recrystallized from a tetrahydrofuran-hexane mixture to give 4.41 g of a compound represented by the formula

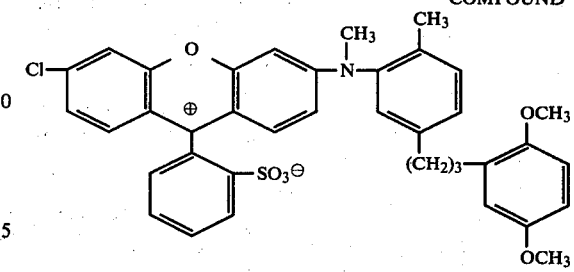

COMPOUND V

A mixture of 4.10 g (6.0 mmole) of compound V, 2.02 g (13.3 mmole) of phenylsemicarbazide

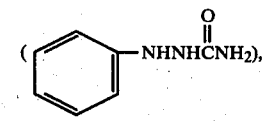

and 2.0 g of magnesium oxide in 120 ml of dimethylsulfoxide was heated at 130° C. for about 1½ hours. The reaction mixture was poured into 600 ml of 5% hydrochloric acid and the precipitate collected by filtration to give the crude product which was washed with water and then purified with high performance liquid chromatography (20% V/V MeOH/80% $CH_2Cl_2$ on silica gel) to give 3.66 g of Dye XIII.

EXAMPLE XIV

A mixture of 5.08 g (7.6 mmole) of compound V and 2.02 g (8.4 mmole) of 1,4-diphenyl-4-methyl semicarbazide in about 80 ml. of dry pyridine was heated at 110° C. for about 50 minutes. The reaction mixture was poured into 5% hydrochloric acid and the resulting precipitate collected by filtration. Thin layer chromatography showed the crude product to be similar to a sample of crude material which had been purified by preparative thin layer chromatography (6/94 V/V MeOH/$CH_2Cl_2$) having the formula of Dye XIV.

EXAMPLE XV

A solution of 100 mg of Dye XIII in about 5 ml of diglyme was treated with excess potassium tertiary butoxide for about 1 hour during which time the solution turned blue. Excess dimethyl sulfate was added to the solution and it gradually turned back to a magenta color over a ½ hour period. The reaction mixture was stirred over a weekend and then poured into a saturated sodium chloride solution. The resulting precipitate was collected by filtration, purified by preparative thin layer chromatography (10/90 V/V MeOH/$CH_2Cl_2$) to give Dye XV, a reddish-magenta compound.

EXAMPLE XVI

Crude Dye XIV was dissolved in 10 ml of methanol and about 2 ml of methyl iodide were added to the solution. An aliquot of 5% NaOH was added. The reaction mixutre turned purplish and then gradually back to magenta over a period of an hour. The process was repeated until no color change could be observed. The solvent was removed and the residue and water dissolved in methylene chloride. The methylene chloride was removed to give crude Dye XVI which was purified by high performance liquid chromatography. The pure Dye XVI exhibited λmax=542 nm, ε=81,000. The structure of the product was confirmed by IR, visible and UV spectra.

EXAMPLE XVII

A mixture of 6.675 g (10.0 mmole) of compound V and 3.15 g (10.5 mmole) of a compound represented by the formula

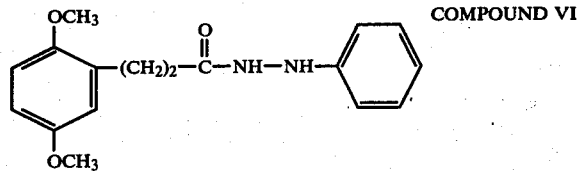

COMPOUND VI in 25 ml of dry pyridine was heated to 130° C. for 2 hours. The resulting solution was poured into 800 ml of 5% hydrochloric acid and the resulting precipitate collected by filtration, washed with water and dried in air to give about 9–10 g of crude Dye XVII. The crude product was purified by preparative thin layer chromatography to give pure Dye XVII, λmax(meth.cellosolve) 541 nm, ε=71,200. The structure of the product was confirmed by IR and visible spectra.

EXAMPLE XVIII

Crude Dye XVII was dissolved in 500 ml of methylene chloride and excess conc. KOH/methanol was added until the solution turned blue after which 13 ml of methyl iodide were added and the solution stirred for 1 hour. Thin layer chromatography showed the reaction to be complete. The solution was washed with water and evaporated to dryness on a rotary evaporator. Separation by high performance liquid chromatography gave 3.18 g of pure Dye XVIII

EXAMPLE XIX

To a solution of 20 g of Dye XVII in 400 ml of dry dimethylformamide there were added 1.1 g of NaH with stirring and the stirring continued until the solution turned blue (about 20 minutes). To the solution there were added 12 g of an iodide compound represented by the formula

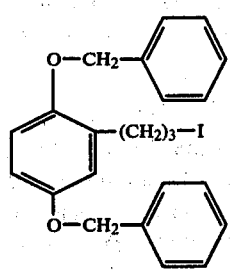

COMPOUND VII and the reaction mixture was stirred overnight. An additional 0.4 g of NaH and 5.7 g of the iodide compound were added and the reaction mixture again stirred overnight. The reaction mixture was poured into 3500 ml of diethyl ether and the gummy material which precipitated was collected by filtration and oven dried. The filtrate was poured into a 5% hydrochloric acid/water solution. The resulting gummy material was collected by filtration. The gums were combined and dissolved in methylene chloride. The solvent was dried and removed from the residue by rotary evaporation. The solid was dried in an oven overnight to give 32.4 g of crude product which was purified by chromatography to give 7.2 g of Dye XIX.

EXAMPLE XX

A mixture of 40 mg (0.0599 mole) of compound V and 0.01 g of phenylthiosemicarbazide in 0.5 ml of dry diglyme was refluxed for 1½ hours and the resulting precipitate collected by filtration. Both the crystalline precipitate and the mother liquor were chromatographed on thick silica gel plates and developed in 4%, and then 6% methanol/methylene chloride. The precipitate was then collected and dried to give Dye XX, max (meth.cell.)=544 nm, =46,000. The structure of the compound was confirmed by IR and UV spectra.

EXAMPLE XXI

A mixture of 40 mg of compound II and 32 mg of compound VI in about 0.5 ml of dry pyridine was allowed to stand in a test tube at room temperature for 15 minutes. Thin layer chromatography showed the reaction to be complete. The resulting precipitate was collected and purified by dissolving it in methylene chloride, placing the solution on a silica column and washing with a 3/97 V/V mixture of methanol and methylene chloride. The residue was collected and dried to give Dye XXI, λmax (meth.cell.)=510 nm, ε=9,000.

EXAMPLE XXII

A mixture of 4 g (0.01 mole) of compound, II, 12 g (0.04 mole) of compound VI and 2.0 g (0.02 mole) of potassium acetate in 40 ml of diglyme was heated on a steam bath for about 4 hours. Thin layer chromatography (90/10 V/V chloroform/methanol) showed the reaction to be virtually complete. The magenta solution was filtered and the filtrate was poured over a slurry of crushed ice and dilute hydrochloric acid. The precipitate was recovered by filtration and dried to give about 8.4 g of crude Dye XXII which was purified to give pure Dye XXII, λmax (meth.cell.)=536 nm, ε=70,000.

EXAMPLE XXIII

To a solution of 676 mg (0.886 mmole) of a compound represented by the formula

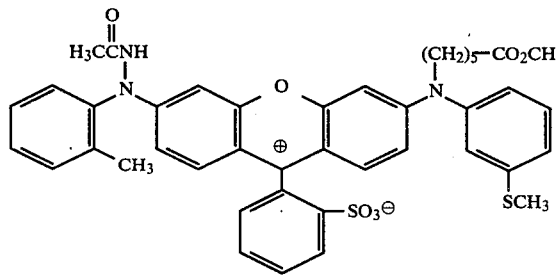

and 1.086 ml. (1.48 g., 7.59 mmole) of ethylbromobutyrate in 7 ml. of dimethylformamide there were added 1.223 g. (8.86 mmole) of anhydrous, finely divided $K_2CO_3$. The mixture was stirred under argon and heated for 2½ hours in a 100° C. bath. The cooled reaction mixture was diluted with chloroform and washed with 1 N hydrochloric acid. The organic phase was dried over sodium sulfate and then subjected to rotary evaporation to give a liquid magenta residue. The residue was then subjected to high vacuum overnight to remove excess halide. The residue was triturated twice with hexane to give crude Dye XXIII. The crude dye was purified by column chromatography.

EXAMPLE XXIV

Dye XXIII (308 mg., 0.351 mmole) was dissolved in 4 ml. of glacial acetic acid. To this solution there were added, dropwise from a syringe at room temperature, 220.2 mg. (1.159 mmole), diluted with about 0.5 ml. of acetic acid, of a solution of 40% w/w of peracetic acid in acetic acid. The reaction mixture was stirred at room temperature under argon for 3¼ hours, poured carefully into saturated sodium bicarbonate solution and stirred until vigorous foaming had subsided. Methylene chloride and additional sodium bicarbonate were added and the mixture stirred for 2 hours. The organic phase was separated, washed with sodium bicarbonate, dried over sodium sulfate and the solvent removed by rotary evaporation to give 294 mg. of Dye XXIV.

EXAMPLE XXV

Dye XXIV (294 mg., 0.323 mmole) was dissolved in 6 ml. of dry p-dioxane and 0.65 ml. of 1 N aqueous sodium hydroxide was added with stirring. The resulting mixture was stirred for 2 hours under argon. Additional sodium hydroxide (0.65 ml.) was added and stirring continued for 1 hour. Another 0.65 ml. of sodium hydroxide was added and stirring continued for 50 minutes. The mixture was poured into an ice-1 N HCl mixture and the precipitate collected by filtration. The filtrate was extracted twice with methylene chloride. The solid was dissolved in methylene chloride containing some methanol and the combined solutions were dried over sodium sulfate. The solvent was removed by rotary evaporation to give 236 mg. of Dye XXV, a purple solid.

Although the invention has been described with respect to various specific embodiments thereof, it is not intended to be limited thereto but rather those skilled in the art will recognize that variations and modifications may be made therein which are within the spirit of the invention and the scope of the appended claims.

What is claimed is:
1. A compound represented by the formula

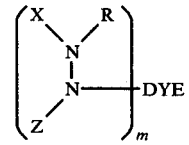

wherein X is

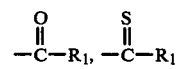

or $-SO_2R_1$; Z is H, alkyl or aryl; R is H, alkyl or aryl provided that Z and R are not both H; DYE is a xanthene dye moiety; $R_1$ is H, alkyl, aryl, $-NH_2$, $NHR_2$,

or $OR_2$; $R_2$ is H, alkyl or aryl; and m is 1 or 2.

2. A compound as defined in claim 1 wherein R and $R_1$ are each alkyl having 2 or 3 carbon atoms.

* * * * *